United States Patent Office 2,800,461
Patented July 23, 1957

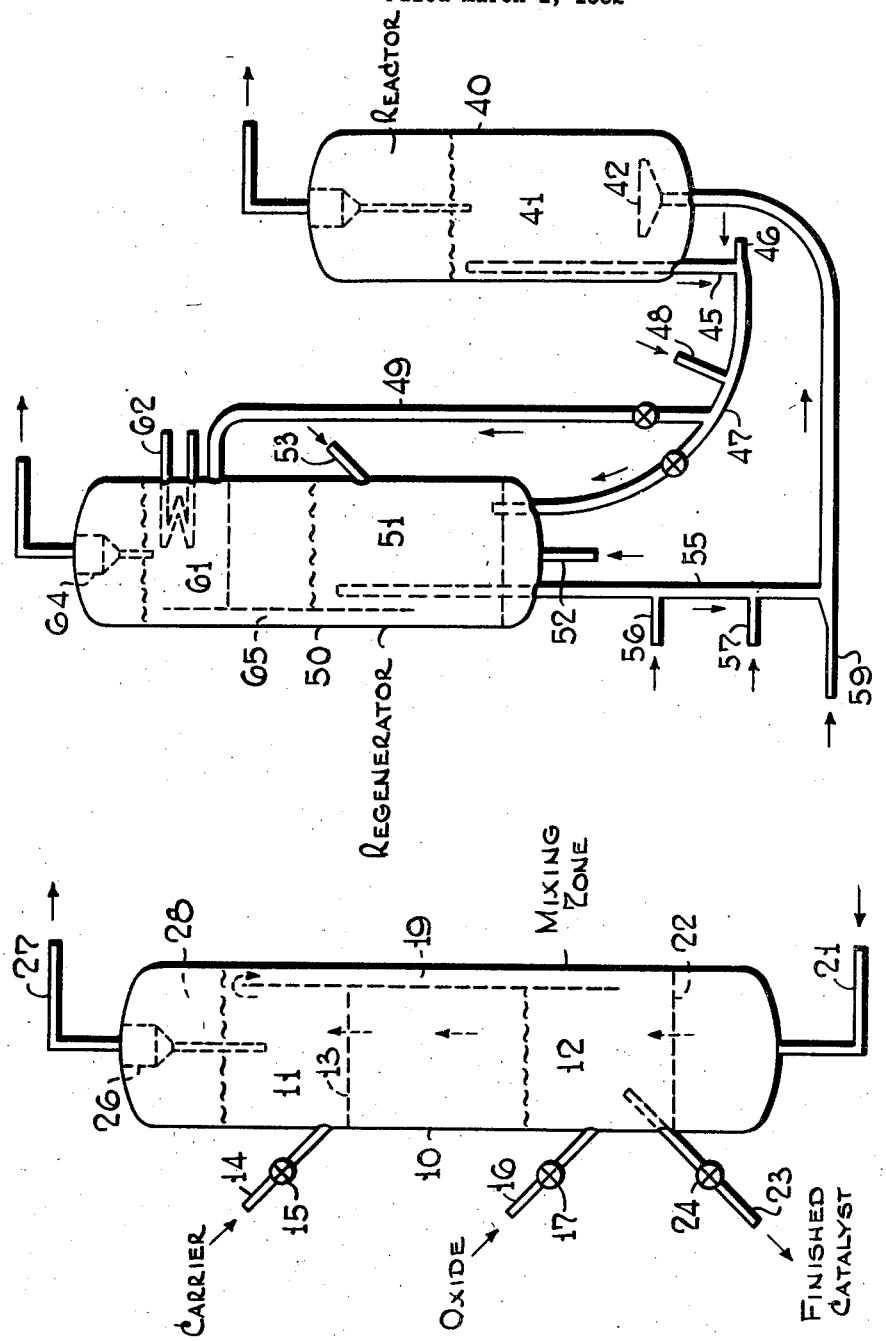

2,800,461

METHOD OF CATALYST PREPARATION AND REGENERATION

Kenneth K. Kearby, Cranford, and George R. Gilbert, Elizabeth, N. J., assignors to Esso Research and Engineering Company, a corporation of Delaware Application March 1, 1952, Serial No. 274,438

3 Claims. (Cl. 252—417)

This invention relates to the use of solid catalysts in the treatment and conversion of hydrocarbon materials. More particularly it relates to the preparation and use of catalysts containing active constituents which become volatile at the higher temperature levels which are useful in the regeneration of spent catalysts.

Recent developments in the petroleum refining industry have concentrated attention upon methods for the conversion of low boiling feed stocks, particularly those in the middle and heavy portions of the naphtha boiling range, into products of improved octane number. Considerable success along these lines has been obtained by the process known as hydroforming. In this process the hydrocarbon feed stock is treated at operating temperatures of about 700°–1000° F., in the presence of a catalyst of suitable activity and in a hydrogen-containing atmosphere at such pressure that the hydrocarbon transformation reactions taking place result in a net production of hydrogen. A variety of isomerization and hydrogen transfer reactions are involved, which may include dehydrogenation, paraffin and naphthene isomerization, cyclization, or aromatization. All of these result together in producing a product of markedly improved motor fuel value as determined by octane rating.

Catalysts which have been found useful in the hydroforming process include various metals and metal oxides, chiefly those in groups V, VI and VIII of the periodic table, and the catalyst supports which have given the best results have been those containing alumina as a major constituent. Particularly useful catalysts have been found consisting of molybdic oxide, or chromic oxide, supported on an active alumina base. A wide variety of other oxides has been examined in this connection, and it has been found that useful improvements in the catalyst can be obtained by the addition to the catalyst onto the carrier of other metal oxides which can function either as promoters to improve catalyst activity or selectivity, or as stabilizers to improve catalyst life. Some of these catalysts have been found useful in a variety of other hydrocarbon conversion reactions, particularly where hydrogen transfer is involved.

Certain basic disadvantages of these catalysts have been found by experience. One is the fact that with molybdenum oxide it is difficult to prepare high activity catalysts containing more than moderate percentages of the activating oxide. Furthermore, the tendency of the group VI oxides to sublime off the carrier when used at anything higher than moderate temperature levels limits the concentration of active oxide which can be employed, or the regeneration temperature to which the catalyst can be subjected, or both. The tendency of these oxides to be removed by sublimation during regeneration becomes increasingly serious with an increase in either the concentration of active component or the regeneration temperature.

In the case of molybdenum oxide catalysts on an alumina-containing base, therefore, the practical limit has been about 10% molybdenum oxide. While higher concentrations such as 12% molybdenum oxide catalysts have been used, their usefulness has been severely limited in that the regeneration temperatures to which they can be subjected without serious loss are much more restricted than the characteristics of the carrier would otherwise permit. Catalyst compositions containing still higher percentages of the active oxide have been prepared and tested. Unfortunately, however, their activity and other useful characteristics have not been available for commercial purposes, in view of the serious complications caused by the tendency of the molybdenum oxide to depart from the carrier surface on heating and deposit itself at random in cooler parts of the apparatus.

The object of the present invention is to provide a process which permits continuous operation with a fluidized catalyst containing a volatile active constituent, at temperatures which would otherwise be too high for satisfactory operation.

A further object is to provide a convenient method for preparing an active hydrocarbon conversion catalyst containing a constituent which becomes readily volatilizable at temperatures above those employed in the on-stream or conversion period.

It is a still further object to provide a system for replenishing the content of the active component in such a catalyst which becomes depleted by regeneration at temperatures above that at which rapid loss due to volatilization takes place.

The process of the present invention is particularly valuable for use in the preparation and maintenance of catalysts in which the active constituent is molybdic oxide. Molybdic oxide has an appreciable vapor pressure at temperatures of the order of 1300°–1500° F. which are only slightly higher than the temperature of 1200° F. which is commonly employed as an operating limit in the oxidative regeneration of the spent hydrocarbon conversion catalyst. Even at a nominal maximum regeneration temperature of 1200° F., there is some tendency for $MoO_3$ to be carried off the surface of the catalyst carrier in the regeneration gas, from which it is frequently deposited in cooler parts of the apparatus. This may be due, in part, to high spot temperatures caused by local overheating during the combustion process involved in the removal of carbonaceous deposits from the spent catalyst. Thus, this tendency towards the loss of molybdenum oxide is found to be less when the catalyst is in the form of a fluid bed than when a fixed bed of catalyst is undergoing regeneration.

The temperature limit in the regeneration stage also limits the amount of heat which can be transferred from the regeneration stage as sensible heat of the flowing fluid catalyst stream to supply heat of reaction for an endothermic hydrocarbon conversion process, such as cracking, dehydrogenation or hydroforming. This method of heat transfer is important in many such catalytic processes, and the ability to put it to good use is a particular advantage of the fluid type of operation. The limit on regeneration temperature which is set by the tendency of molybdic oxide to sublime from such catalysts thus has an important economic bearing on the design and operation of equipment to use these catalysts.

The same principles apply, in general, to other catalysts containing volatilizable oxide constituents, such as chromic oxide. Chromic oxide is volatile at somewhat higher temperatures than molybdic oxide. Catalysts containing it, however, are frequently used at significantly higher operating temperatures, which may be as high as 1300°–1400° F., so that the same principles are found to apply at the higher temperature level. The dry-mix method makes excellent chromia catalysts on the supports mentioned above when chromic acid is used. The powdered support and chromic acid may simply be mixed or ground together and heated at a temperature of 1000°–1400° F. Lower oxides of chromium are oxidized to some extent to the chromic state and may be used, although $CrO_3$ is preferred because of its higher volatility and availability. The method is especially satisfactory when an alumina support containing a promoter or stabilizer, such as a compound of K, Ca, or Mg, is used. In place of the chromic acid other volatile compounds of chromium such as chlorides, fluorides and oxy halides, and low melting compounds such as soaps and other organic compounds may be admixed with the base without the use of a solvent.

The invention will be illustrated by describing its use in connection with a catalyst comprising molybdic oxide on an active alumina base. This active alumina may be of any suitable variety and a particularly useful catalyst for use in fluid bed operation is prepared by using a spray-dried alumina hydrogel which may contain a minor percentage of silica, titania, or zirconia to give improved heat stability to the carrier.

Any support which has previously been described for molybdenum oxide hydroforming catalysts can be used with this technique. Common supports are activated alumina hydrates, including calcined bauxite, calcined precipitated alumina trihydrate, calcined alumina gel prepared by hydrolysis of an aluminum alcoholate or commercial activated aluminas such as Alorco F–10, Alorco H–41 and Porocel. The calcined forms of alumina may be the monohydrate, gamma, delta, eta, theta or beta $Al_2O_3$, or other structural forms which have a surface area of 25 sq. meters per gram or higher. The aluminas may be stabilized by incorporating minor amounts of $SiO_2$, $ZrO_2$, $TiO_2$, CaO, MgO, $K_2O$, $Cr_2O_3$, or phosphate. In addition to such aluminas, the cracking catalyst type support which have been described as supports for hydroforming catalysts may also be used. These include silica containing minor amounts of $Al_2O_3$, MgO, $ZrO_2$, or $ThO_2$ and $Al_2O_3$—$B_2O_3$ compositions. In the use of these supports as well as alumina supports, the support or the impregnated catalysts can be partly desurfaced by heating, steaming, or by use as a cracking catalyst.

According to the present invention, a highly active molybdenum oxide-alumina catalyst of desired characteristics is simply prepared and its activity maintained by adding a suitable supply of molybdenum oxide while maintaining the catalyst base as a hot fluid bed, adding directly thereto a subdivided solid material capable of releasing molybdic oxide vapors on heating.

The material used as a source of molybdic oxide can be a technical grade or pure grade of $MoO_3$. It may also consist of ammonium molybdate in the crystalline form or in the form of an aqueous solution, such as that which might be prepared by extracting molybdic oxide from a crude molybdenum oxide with ammonium hydroxide.

A particular advantage of the present invention, however, is that it may be employed using a crude molybdenum oxide directly as the molybdenum oxide-containing material to be injected into the fluid bed of catalyst carrier. Such a crude material, for example, might consist of the raw flotation concentrate of molybdenite ore, or the same ore roasted so as to convert the molybdenum sulfide present at least partly or completely to molybdic oxide. These flotation concentrates consist of particles originally ground to a size of about 0.1 to 30 microns in particle diameter, so that a considerable portion of any residual material other than molybdenum oxide remaining from the crude material can be selectively blown out of the final catalyst preparation as catalyst fines. This is particularly true when the catalyst carrier is in the microspherical form, where the amount of alumina fines in the carrier is ordinarily controlled so as to be substantially less than that in ground catalysts. The same principle applies, however, to ground catalysts, since the fines are lost in a normal operation.

It has been found, additionally, that catalysts of very satisfactory activity can be prepared from crude commercial molybdenum oxide even without separating any of the materials introduced as impurities with the crude oxide. Catalysts containing approximately 90% $Al_2O_3$ and 10% $MoO_3$ prepared from C. P. $MoO_3$ and from a crude concentrate containing only 87% $MoO_3$ gave the following yields when hydroforming a 50 O. N. 200°–330° F. virgin naphtha at 200 lbs./sq. in. pressure, 900° F., and 2000 cu. ft. $H_2$ per barrel of naphtha.

| Type $MoO_3$ | C. P. | 87% Crude |
|---|---|---|
| Feed Rate, w./hr./w. | 0.90 | 1.02 |
| $C_5$+Gasoline: | | |
| Research Octane Number | 94.2 | 95.4 |
| Yield, vol. percent | 80.5 | 80.4 |
| Butane Yield, vol. percent | 9.2 | 7.6 |
| Dry Gas Yield, wt. percent | 8.3 | 9.3 |

The use of this crude material represents a substantial saving in cost of the final preparation, since the cost of the molybdic oxide and particularly the pure molybdic oxide or ammonium molybdate which has been used in previous catalyst preparation is an important item in total expense. The principal impurity present is silica, with only minor amounts or traces of other metallic constituents. It is known to recover molybdic oxide vapors from such a crude material by sublimation in a separate heating zone and a process of this type may be used in the practice of the present invention. The direct injection process described above is preferred, however, since it gives an equally good catalyst with simpler equipment and a simpler operating procedure.

Typical apparatus which may be employed in the practice of the present invention will now be described in connection with the attached drawings in which:

Figure 1 describes an apparatus suitable for the initial preparation of a fresh catalyst of high activity and Figure 2 shows an adaptation to maintain the desired molybdenum concentration and activity of a fluid catalyst circulating between a reactor and regenerator in a hydrocarbon conversion process.

In Figure 1, 10 is a catalyst preparation vessel containing an upper molybdenum oxide recovery bed or zone 11 and a lower mixing and calcining zone 12. The alumina base to be employed is introduced into zone 11 by way of supply line 14. Alumina may be added continuously or intermittently as may be desired at a rate controlled by valve 15. The alumina used can be fresh material or it may be recovered alumina either free of molybdenum oxide or containing a relatively low molybdenum oxide content, which is to be built up in the catalyst preparation vessel.

A suitable source of molybdenum oxide, which may be crude roasted molybdenite or a purer form or source of molybdic oxide, is similarly supplied to bed 12 by way of line 16. The rate of molybdenum oxide addition is controlled as desired by valve 17.

The upper bed or zone 11 is shown in the drawing as being supported on a grid plate 13, which may be a perforated baffle or bubble cap plate and which separates bed 11 from a gas space above bed 12. In this modification of the apparatus, additional alumina added to bed 11 from line 14 causes the displacement of solid by overflow into the downcomer 19, which feeds solid directly into bed 12. It will be understood that the same results may be accomplished by placing bed 11 and bed 12 in separate vessels, with suitable provision for the transfer of gas and solid between them. It may also be possible to operate using a somewhat more open grid 13 without the use of downcomer 19, whereby the grid 13 serves as a baffle to prevent the free transfer of fluidized solid from zone or bed 11 to zone or bed 12, while at the same time permitting the free upflow of gas through the system.

The solid in both beds is maintained in the turbulent fluid state by an upflowing stream of gas introduced through line 21 at the bottom of vessel 10, below grid 22 which supports the fluidized solid in bed 12. Finished catalyst is withdrawn from bed 12 by line 23, at a rate controlled by valve 24. Additional time for the molybdenum oxide to disperse itself on the surface of the alumina may be supplied, if desired, by adding a third fluid bed (not shown) below the mixing bed 12 before the finished catalyst is withdrawn from vessel 10. Suitable cooling means may also be supplied to cool the finished catalyst withdrawn through line 23, in case it is to be stored before use.

In the operation of this equipment, bed 11 is at a relatively low temperature, preferably about 900° F. or lower, so that any molybdic oxide carried out of bed 12 by the gas stream is adsorbed on to the fresh alumina and removed from the vent gases. Suitable means, such as a cyclone separator 26, may be supplied, if desired, to remove catalyst fines from the vent gas stream 27 and return them to bed 11. As noted above, however, in certain cases it may be desirable to use separating means of low efficiency or no separators at all at this stage, so as to permit the selective removal of entrained fines impurities when a crude molybdenum oxide is being used as a source of molybdic oxide. In any case, the vapor space 28 above bed 11 may be made sufficiently high to serve to knock down a portion or substantially all of the catalyst particles entrained from bed 11.

Heat to maintain the solid in mixing bed 12 at the desired temperature level, above 1000° F., may be supplied as sensible heat of the aerating gas stream 21 or in any suitable manner. This gas should be inert or oxidizing in character. It may be a combustion gas stream, regeneration flue gas, diluted air, nitrogen, carbon dioxide, superheated steam, or the like. The rate at which solid flows through the treating vessel is ordinarily relatively slow, to provide sufficient time for the mixing and heat-treating of the catalyst preparation. The aerating gas stream is, therefore, sufficient in quantity to supply the necessary heat to raise the temperature of the solid in zone 12 to the desired temperature in the range of about 1000°–1400° F. The higher the temperature the shorter the time required to effect the redistribution of the molybdenum oxide. The use of the cool bed of catalyst carrier 11 permits the temperature in the mixing bed 12 to be maintained at a level of 1125° F. or higher, which is above the temperature limit frequently set in the regeneration of molybdenum oxide catalysts to avoid sublimation loss. The use of reducing gases lowers the volatility of the $MoO_3$ and is less satisfactory than inert or oxidizing gases. The presence of $H_2O$ in the gas stream, under non-reducing or oxidizing conditions, is found to be particularly helpful in promoting the distribution of the molybdenum oxide throughout the catalyst.

In certain cases, the addition of molybdenum oxide may be carried out in conjunction with the addition of halides, such as those of Cl or F, when their addition is desired.

As indicated above, it is ordinarily not necessary to use a pure grade of molybdic oxide, or even a material as pure as commercial molybdenum oxide. The raw flotation concentrate obtained as the first step in the recovery of molybenum from molybdenite ore consists largely of molybdenum sulfide with silica as the major impurity. This material is converted to a crude molybdic oxide by roasting in air, which changes the tetravalent disulfide into the hexavalent trioxide. The roasted material thus consists largely of molybdic oxide plus silica as an impurity. The presence of silica in the finished catalyst consisting of molybdenum oxide on an alumina base is found to be entirely harmless. It acts at most as a diluent, and it may even exert a beneficial effect insofar as it enters into the catalyst composition.

Depending, therefore, upon the size of the ground material in the raw flotation concentrate, the larger particles present as impurities in this crude material may consist chiefly of silica, with molybdenum oxide being present in both the finer and coarser particle size ranges. The remaining trace impurities may thus be concentrated to a considerable extent in the finest particle size range. Upon using this material as a source of molybdic oxide according to the present invention, therefore, the molybdenum oxide will be sublimed out on to the alumina in making the finished catalyst. The larger silica particles present will remain in the final catalyst composition especially when using a ground alumina carrier having a normal wide range of particle sizes. The residual mineral impurities, which are found not to be particularly harmful in any case, will be largely stripped out along with catalyst fines in the vent gas stream from the cyclone separators.

As indicated above, the problem of maintaining a desired molybdenum oxide concentration on a hydroforming catalyst often becomes one critical factor in plant design. This is particularly true where the sensible heat of the catalyst is being used to convey useful heat from the regeneration stage to the reaction stage in fluid type operation. The application of the present invention to such an operating cycle will now be illustrated, referring to the schematic drawing of Figure 2.

Reactor 40 contains a fluid bed of catalyst 41 which is maintained in turbulent fluid motion by an upflowing stream of feed gas, introduced through inlet pipe 42 near the bottom of the bed together with a recycle stream of regenerated catalyst. An aliquot of the catalyst in bed 41 is continuously withdrawn from a point within reactor 40, through catalyst withdrawal line 45. This stream, including catalyst which has become more or less spent due to the disposition of carbonaceous materials formed during the hydroforming reaction, is picked up in a stream of suitable gas introduced at line 46 and conveyed therewith through transfer line 47 to a separate regeneration vessel 50, where it forms a separate fluid bed 51. Air or an oxidizing gas of suitable oxygen concentration is introduced into vessel 50 through line 52. The carrier gas in line 46 may be air or an oxidizing gas of lower oxygen content. Minor amounts of water may be included with the air to increase the oxidation and redistribution of the molybdenum oxide. These amounts are usually in the range of 1–10 mol percent in the gas present in vessel 51. It may also serve as a stripping gas, or various combinations of stripping gas, or auxiliary stripping procedures may be introduced in the catalyst withdrawal line 45, in a manner which has no bearing on the present invention.

In any case, however, it is important that the carrier gas introduced through line 46 be non-reducing in character, that is to say, it is preferably either inert or an oxidizing gas, since the presence of a reducing gas at this stage will ordinarily only increase the amount of oxidation required to reoxidize the reduced molybdic oxide back to the hexavalent state. This reoxidation stage will put an even more serious heat load on the regeneration vessel, where the maximum permissible temperature is already limited by the tendency of molybdic oxide to sublime from the catalyst surface.

According to the present invention, molybdic oxide to replace any sublimed from the catalyst surface may be introduced into the fluid bed 51 by adding it directly into transfer line 47, as by a separate feed line 48, or it may be introduced directly into fluid bed 51 through an inlet line 53. Regenerated catalyst is withdrawn downwardly from bed 51 through line 55, in a manner analogous to line 45 in reactor vessel 40. The atmosphere in line 55 may be maintained inert or oxidizing in character, in which case the molybdic oxide necessary to replenish molybdenum oxide lost from the regenerated catalyst may be introduced by way of line 55 to line 56 above the point of introduction of the oxidizing-aerating gas through line 57. Additional stripping or catalyst pretreating equipment (not shown) may be included to treat the catalyst flowing through line 55 in any desired manner, before it contacts the hydrocarbon feed stream introduced through line 59 and flows thence into the reactor feed line 42.

The particular modification shown by the introduction of molybdic oxide through line 56 avoids the contact of molybdic oxide vapors with the relatively large amount of aerating and regenerating gas present in vessel 50, and this embodiment of the invention is a particularly desirable one. Whether or not this modification is employed, it is frequently advantageous to carry the regeneration vent gases escaping from above fluid bed 51 in vessel 50 through a second fluid bed of catalyst at a somewhat lower temperature level. By this means, molybdic oxide entrained into the regeneration vent gases at the high temperature level may be largely or completely stripped out and adsorbed therefrom on to the colder catalyst. The completeness with which this recovery can be effected depends on the temperature level of this secondary bed and upon the thoroughness with which the vent gases can be contacted with the cooler catalyst particles.

Various means of effecting this secondary recovery can be employed. In Figure 2, there is shown a particular modification in which spent catalyst withdrawn from the reactor bed 41 at hydroforming operating temperature, which may be about 900° F., is conveyed not through line 47 but rather partly or entirely through the branch line 49 leading to bed 61, located within regeneration vessel 50 at an upper level. The regeneration vent gases which serve to maintain turbulence within bed 61 are of very low oxygen content, so that they serve the additional function of stripping entrained and occluded hydrocarbon from the spent catalyst. At the same time, these regeneration vent gases are cooled and their molybdenum oxide recovered by contact with this relatively cool catalyst. Auxiliary cooling means 62 may be employed, if desired, to still further adjust the temperature of the catalyst in bed 61. The regeneration vent gases escape finally through the top of vessel 50 through a conventional separating means, such as cyclone separator 64.

Catalyst from bed 61 overflows through a downcomer 65 and enters directly into fluid bed 51 for the main regeneration step. It will be understood, of course, that the process of this invention is not limited to the use of the second bed of cool catalyst, and that the direct fluid bed mixing may be used alone to advantage in replenishing the catalytic oxide on a partly spent catalyst. In this case the regeneration temperature in bed 51 may be more strictly limited to the range of about 1000 to 1125 or 1200° F., which can be safely exceeded when the two bed system is employed.

The molybdenum content of these catalysts can be varied to obtain a desired distribution of products in the on-stream or catalytic reforming reaction stage. Catalysts of low molybdenum oxide content prepared in this manner give a more volatile product and give results superior to those obtained with wet impregnated molybdenum oxide catalysts of low molybdenum oxide contents. In place of the conventional 8–12% $MoO_3$, catalysts containing only 2–8% $MoO_3$ may be used and the desired amount of $MoO_3$ maintained by continuous or intermittent addition. For less volatile and highly aromatized products $MoO_3$ contents above 8–12% may be used. Contents of 20% or even 30% can be maintained by the addition of $MoO_3$ during operation.

The surface characteristics of the alumina or other carrier employed may have an important bearing on the character of the product obtained. Thus, an activated alumina of high surface area containing 10–20% molybdenum oxide will be more active than a catalyst on low surface area alumina containing 5–10% molybdenum oxide, but may still give approximately the same product distribution. Product distribution can also be controlled by modifying the support by other techniques than desurfacing. Thus, the variation of the $SiO_2$ content of alumina bases or of the alumina content of silica bases varies the relative cracking and isomerizing activity of molybdenum oxide catalysts made with these supports.

Other compounds of molybdenum can be used if they are sufficiently volatile or melt at low temperature and can be dispersed over the support and then converted into an active dehydrogenating oxide or sulfide. Halides of molybdenum and oxyhalides are quite volatile and can be dispersed on the support in vaporized or melted form and then decomposed by treating with a gas containing oxygen or water. Certain organic compounds of molybdenum can also be used if they disperse themselves over the support when heated or treated. As will be mentioned below, in the application of this technique to other components, such organic compounds as laurates, palmitates, stearates, naphthenates, and acetylacetonates can be used and may be added to the support directly without using a solvent.

With molybdenum oxide, and more particularly with other catalytic oxides volatile only at somewhat higher temperatures, some advantage may be realized by carrying out the vapor impregnation at a reduced or subatmospheric pressure. With chromic oxide, for example, the modification of the process results in a significant lowering of the mixing temperature required.

A study of other active catalysts indicates that techniques employing compounds of active components that can be dispersed by heating, can be applied to a wide variety of compositions. In the preparation of such catalysts, the dry-mixing technique can be used in the case of compounds which melt and can be dispersed in melted form, even if they decompose to non-volatile materials and cannot be dispersed as volatile components. In these preparations it appears to be frequently true that some effects other than volatilization are involved. In general, it is found that these surface migration effects are greatest with materials which have low melting points.

The above techniques are applicable to the use of related oxides and sulfides of elements such as W, V, U, and Ta. Particular advantage is obtained with vanadium by taking care to prevent the decomposition of $V_2O_5$ to lower oxides (which are high melting and non-volatile) before it is dispersed on the support.

While the above description has been written primarily from the viewpoint of preparing or replenishing the catalytic oxide content of a catalyst to be used in fluid bed operation, it is obvious that the same method has advantages in other cases. Thus, the finished catalyst withdrawn from bed 12 in Figure 1 is of exceptionally uniform composition as compared with molybdenum oxide catalysts prepared by conventional fixed bed impregnation techniques, and can be pilled or formed in any suitable manner to prepare a useful catalyst for fixed bed or moving bed use.

What is claimed is:

1. A method of preparing a fluidizable molybdenum-oxide-containing alumina catalyst which comprises the steps of: maintaining at a mixing temperature above about 1000° F. a fluidized mixing bed of alumina base catalyst particles, maintaining at a temperature below about 900° F. a fluidized recovery bed of said particles, flowing a non-reducing gas in fluidizing amounts through said mixing bed and then through said recovery bed, introducing fresh alumina base catalyst particles of fluidizable size into said recovery bed, flowing catalyst particles from said recovery bed to said mixing bed, introducing into said mixing bed a crude solid molybdenum-containing material which is converted largely to molybdic oxide vapors at said mixing temperature and at the same time releasing mineral impurities which are substantially smaller than the average particle size of said catalyst particles, distributing molybdic oxide uniformly on the catalyst particles in said mixing zone by the combined effects of sublimation and turbulent fluidization, recovering in said recovery bed molybdic oxide vapors from said gas, selectively removing from the catalyst particles said mineral impurities by entrainment in said gas escaping from said recovery bed, and withdrawing catalyst from said mixing bed.

2. The method of claim 1 wherein said gas contains from about 1 to 10 mole percent of water, to aid in the distribution of the molybdic oxide.

3. The method of continuously regenerating a fluidized catalyst comprising molybdenum oxide on alumina to remove carbonaceous deposits and release heat and at the same time incorporating into said catalyst molybdenum oxide lost by sublimation during use in a regenerative hydroforming process, which comprises causing an oxygen-containing gas to flow upwardly, at a temperature of above about 1000° F., through a fluidized mixing bed of said catalyst, disposed in a regeneration zone, to cause combustion of said carbonaceous deposits, continuously adding a ground solid molybdenum-containing material to said mixing bed and effecting sublimation and conversion of said molybdenum containing material to molybdenum oxide vapors by the heat released by said regeneration and causing uniform distribution of said molybdenum oxide on said catalyst by the combined effects of sublimation and turbulence of said mixing bed, providing a fluidized bed of catalyst disposed above said mixing bed, causing effluent gas from said mixing bed to flow through said upper bed maintained at a temperature below about 900° F. whereby molybdenum oxide vapors are recovered in the cooler uppermost bed, withdrawing catalyst from said uppermost bed and flowing it to said mixing bed and recovering regenerated catalyst enriched in molybdenum oxide substantially at the temperature of said mixing zone for further use in a hydroforming step.

References Cited in the file of this patent

UNITED STATES PATENTS

| | | |
|---|---|---|
| 2,355,831 | Voorhees | Aug. 15, 1944 |
| 2,408,724 | Bailie et al. | Oct. 8, 1946 |
| 2,410,891 | Meinert et al. | Nov. 12, 1946 |
| 2,423,163 | Thomas | July 1, 1947 |
| 2,423,833 | Hirsch | July 15, 1947 |
| 2,471,914 | Sweetser | May 31, 1949 |
| 2,499,255 | Parker | Feb. 28, 1950 |
| 2,546,031 | Hanson | May 20, 1951 |
| 2,651,597 | Corner et al. | Sept. 8, 1953 |
| 2,670,321 | Morrell | Feb. 23, 1954 |